J. & E. W. D. GRAY.
Damping Paper for Web Printing Machinery.
No. 153,894. Patented Aug. 11, 1874.
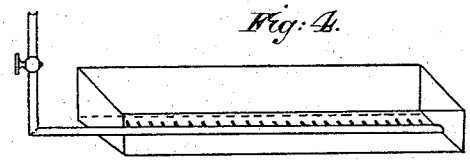
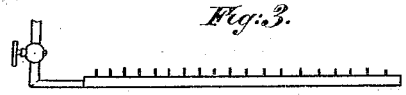
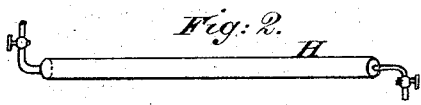
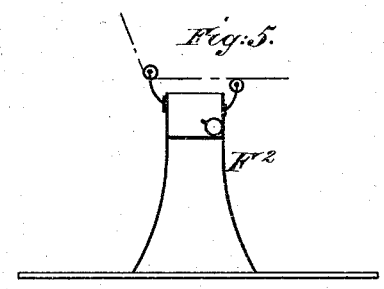
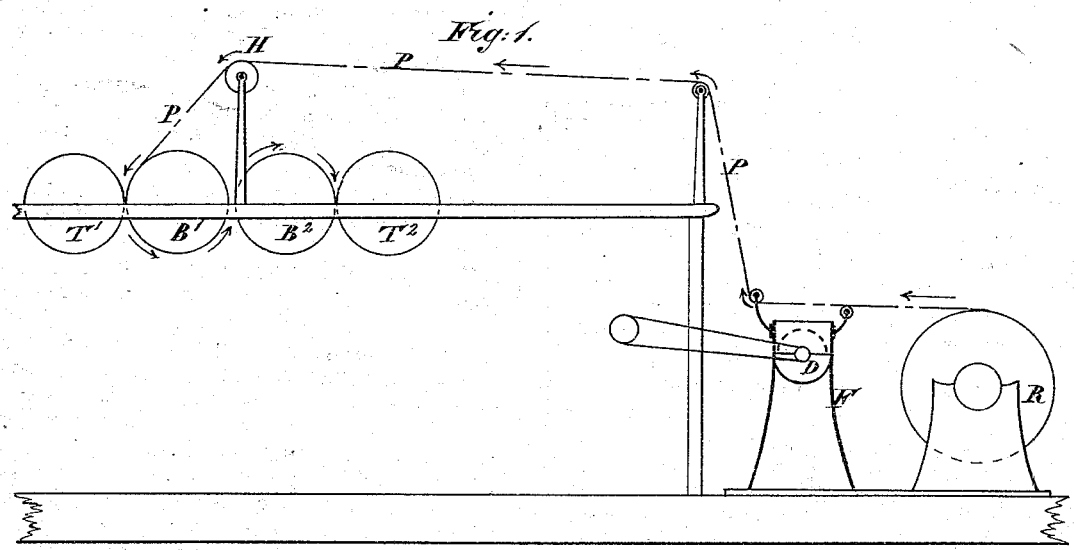

UNITED STATES PATENT OFFICE.

JOHN GRAY, OF CHARLVILLE HOUSE, AND EDMUND W. D. GRAY, OF DUBLIN, IRELAND.

IMPROVEMENT IN DAMPING PAPER FOR WEB-PRINTING MACHINERY.

Specification forming part of Letters Patent No. 153,894, dated August 11, 1874; application filed March 19, 1874.

*To all whom it may concern:*

Be it known that we, JOHN GRAY, knight and member of Parliament, of Charlville House, in the county of Dublin, Ireland, and EDMUND WILLIAM DWYER GRAY, of No. 83 Middle Abbey Street, Dublin aforesaid, subjects of the Queen of Great Britain, have invented or discovered a new and useful Improvement in Damping Paper for Web-Printing Machinery, to effect a thorough damping of the paper as it passes from the roll to the printing-cylinders; and we, the said JOHN GRAY and EDMUND WILLIAM DWYER GRAY, do hereby declare the nature of the said invention, and in what manner the same is to be performed, to be particularly described and ascertained in and by the following statement thereof—that is to say:

The object to be accomplished by means of our invention is the instantaneous and thorough damping of the substance, as well as of the surface, of the paper used for printing-machines which print from the roll or web, and the effecting such damping after the roll has been placed *in situ* on or in connection with the machine, and while the paper is passing from the roll to the printing or impressing portion of the machine, thus saving the expense, time, and practical inconvenience of requiring to have the paper wetted previously, so as to secure a damping of the substance of the paper, as is done by the ordinary process of damping and allowing the paper to soak for some hours, which, hitherto, has been the only means known to printers for effecting a damping of the substance as well as of the surfaces of the paper. Various means have heretofore been tried for damping the paper as it passes from the roll to the impressing portion of the printing machinery, but none of them have succeeded in doing more than damping the surfaces.

We will now proceed to describe more in detail our invention and the means which we have found to be most satisfactory and effective for producing an instantaneous, thorough, and through damping of the substance as well as of the surfaces of the paper. Our improved process may be described as consisting of two stages or operations. The first stage is the damping of one side of the sheet of the paper as it unwinds from off the roll. The second stage or operation is to cause the paper, after it has been wetted or damped on one side, to pass in close contact with a heated metallic or other body interposed between the arrangement for producing the first damping operation and the printing or impressing portion of the machine. By the operation of this heated body the damp or wet imparted to the one surface of the paper in the first stage is converted into vapor or steam by the heat of the heated metallic or other body, and part of it is forced into the substance of, and part visibly through the surface of, the passing paper, thus imparting the second or thorough and through damping to it immediately before it passes to be pressed between the type-bed and the impression-blanket of the machine, and so preparing it to receive more effectually the impression from the inked types.

The damping of one side or surface of the sheet of paper may be effected in a great variety of ways. It may be effected by directing a very fine spray of water onto it as it is unwound from off the roll, or it may be effected by a damping-roller or by other suitable appliance.

The paper so damped is carried on and guided by cylindrical rollers to the impression portion of the machine, and, in the course of its transit, is passed over a cylinder or roller, or a segmental section of a cylinder heated by steam, hot air, or otherwise, in such a position that the wetted side of the paper is brought in close contact with the heated surface, and the water of dampness is more or less vaporized by the heat, and the vapor or steam produced, having no free exit from between the heated body and the paper, penetrates the substance of the paper, and in part visibly passes through it, thus damping the second surface as well as the substance of the paper, and preparing it for the reception of the inking impression, which it receives immediately after it is so damped.

Various modifications of the mechanical means for effecting the two stages may be adopted to suit the various circumstances that will arise in practice, resulting from the construction of the machines, the position of the roll of paper, and other causes which it is needless to enumerate.

In order, however, that the nature of our invention may be more fully understood, we proceed to explain, by means of drawings, figures, letters, and verbal description, one method by which we carry out and apply this our invention to the roll or web printing machine known as the "Victory Printing and Folding Machine."

Drawing No. 1 gives a side view of the Victory web-printing machine, showing the two type-cylinders $T^1$ and $T^2$, the two impression or blanket cylinders $B^1$ and $B^2$, and also the first and second stages of our damping arrangement D and H, as placed *in situ* when the machine is at work. Figure 1 also shows the line of transit of the paper P P P, passing from the roll R over our first stage D of the damping arrangement, over our vaporizing or heating arrangement H, and on to the first type-cylinder, $T^1$. On the right portion of the drawing is the web or roll of paper R, as usually placed near the end of the machine. Between it and the machine is placed an ordinary frame, F, which is secured to the floor. This frame F carries the arrangement D for imparting the first damping to the paper. The paper P P P is shown passing from the roll to type-cylinder $T^1$, situate at the far end of the machine.

The frame F carries a semi-cylindrical vessel, D, in which is placed a long circular brush, similar in form to the brush used for brushing hair by machinery. The brush is geared by a pulley and belt (see Fig. 1) driven by one of the revolving shafts in the printing-machine, and by this means it is given a rapid rotary motion.

This semi-cylindrical vessel contains a quantity of water, which is supplied constantly in regulated quantities by any of the ordinary means, and has a longitudinal slit or opening at its upper surface, which is a little flattened. The revolutions of the brush cause the water taken up by it to be driven off by centrifugal force in a fine spray or mist, which passes through the longitudinal slit or opening in the upper part of the vessel, and sprinkles the lower side of the paper as, guided by two rollers, it passes over one roller and under the other, so as to pass over the upper surface of the cylinder, roll, or other apparatus similar to that just described, which has before been used for damping paper by the old soaking process previous to its being placed on the machine.

The paper passes on, as indicated by the line P P P, till it comes to the heated body or cylinder, (shown at H,) which may be heated by a jet of steam, hot air, or other means. For this case we show it as a hollow cylinder heated by steam let into its interior. The paper is drawn on in close contact with this heated cylinder, the damp side being close to and next the cylinder. The water of dampness is vaporized, and, having no free exit, passes part of it into and some of it through the paper, thus giving it instantaneously the precise quantity of dampness desired, just at the time the paper is passing into the body of the printing-machine to be pressed between the types, stereotype, or other printing-form $T^1$ and the first blanket or impressing cylinder $B^1$ of the machine.

In Drawing No. 1 the frame F, on which we place our first damping arrangement, is shown as carrying the semi-cylindrical vessel, a portion of the top of which is removed to show a part of the roller or brush, (seen in dotted lines.)

Drawing 5, $F^2$ shows another means of producing the spray, which we will describe hereafter.

Fig. 2 shows the steam-cylinder H, with its pipe and stop-cock at each end, one for admitting and regulating the steam, the other for letting out the condensed steam. This steam-heater, as shown, is cylindrical, and is, by preference, made of copper. It is stationary, though capable of being occasionally turned round to permit of a new friction-surface, should symptoms of wear appear; but it may be made of any other metal or suitable substance capable of resisting pressure and heat. This is the cylinder H shown in end section in Drawing No. 1.

Another and, under many circumstances, a more facile mode of producing the spray is shown in Figs. 3 and 4, and on the frame in Fig. 5. An ordinary brass or other metal pipe, of about one inch diameter, furnished with a number of jets, Fig. 3, about three inches apart, each jet having a single opening about the size of a common pin, is placed in a long uncovered box about five to six inches square, Fig. 4.

This pipe is supplied with water, regulated by a tap to a pressure of about ten pounds to the inch, the pressure being derived either from the street-main, an elevated cistern, or a small pump connected with the engine. Rollers, as shown in Fig. 1, at the top of the frame F guide the paper over the box, and when the tap is opened the water, issuing from the jets which are placed inclining upward at an angle of about twenty to thirty degrees, strikes the metal-lined side of the uncovered box about two to three inches from the top, and a portion rises upward in a fine spray or mist, and sprinkles with great regularity the lower surface of the passing paper, while the surplus water is carried off by a waste-pipe. The details of this arrangement are fully shown in Figs. 3 and 4.

Having now described a method by which our invention may be carried out, and the mechanical adjustments required for same in an ordinary case, we desire to add that we do not confine ourselves to these mechanical details, many of which it is obvious must be modified to meet the various circumstances that may be met in different web-printing ma- chines. For example, the vaporizer H may be of various forms: a segment of a large circle will suit some situations, a small rotary roller or cylinder will suit others, and it may be heated with steam, hot air, or otherwise; but for most cases the size about four inches diameter, the hollow cylindrical shape, the material copper, the relative position as regards the other portions of the machine, and the heating medium, steam, as described above, and delineated by the drawings, seem to us likely to produce the most satisfactory results, provided the construction and situation of the machine the damper is applied to will admit of their adoption.

We do not claim as our invention the brush, the jets, the damping-rollers, or other means of applying water to one side or surface of the sheet of paper.

What we do claim as our invention is—

The method herein described of damping paper previously moistened on one side, by passing the paper over a heated surface with the moistened side next said surface, whereby the moisture is converted into vapor and driven through the paper as it passes over the heated surface.

JOHN GRAY.
E. W. DWYER GRAY.

Witnesses:
A. WM. LABERTOUCHE, *Notary Public*,
18 *Fleet Street, Dublin.*
THOS. BALDWIN,
18 *Fleet Street, Dublin.*